United States Patent [19]

Degura et al.

[11] Patent Number: 5,105,294
[45] Date of Patent: Apr. 14, 1992

[54] DIGITAL COMMUNICATING METHOD AND APPARATUS

[75] Inventors: Yasusaburo Degura, Yokohama; Tetsuo Sakanaka, Sagamihara; Haruo Imano, Yokohama, all of Japan

[73] Assignee: Canon Kabushiki Kaisha, Tokyo, Japan

[21] Appl. No.: 368,840

[22] Filed: Jun. 20, 1989

[30] Foreign Application Priority Data

Jun. 21, 1988 [JP] Japan .................. 63-151128
Jun. 21, 1988 [JP] Japan .................. 63-151129
Jun. 21, 1988 [JP] Japan .................. 63-151131

[51] Int. Cl.$^5$ ........................... H04B 10/00
[52] U.S. Cl. ........................ 359/154; 359/115;
359/124; 359/181; 370/109; 342/132; 375/1
[58] Field of Search ............. 455/608, 610, 618, 617,
455/611; 342/132, 201; 375/1; 370/1, 3, 69.1,
108, 109; 389/115, 124, 181

[56] References Cited

U.S. PATENT DOCUMENTS

| 4,300,161 | 11/1981 | Haskell ................... 370/109 |
| 4,918,751 | 4/1990 | Pessot et al. .............. 455/612 |
| 4,928,316 | 5/1990 | Heritage et al. ............ 455/608 |

FOREIGN PATENT DOCUMENTS

| 0085753 | 10/1982 | European Pat. Off. . |
| 59-086337 | 9/1984 | Japan . |
| 0184379 | 8/1987 | Japan .................... 342/132 |
| 0245980 | 10/1987 | Japan .................... 342/132 |
| 0280675 | 12/1987 | Japan .................... 342/132 |
| 2195515 | 4/1988 | United Kingdom ......... 342/132 |

OTHER PUBLICATIONS

H. Hofmann; "Signalverarbeitung mit AOW-Baelementen"; Jan. 1983; pp. 2-23; Radio Fernsehen Elektronik, vol. 32, No. 1.
Electronics, Oct. 7, 1960, pp. 53-57.

*Primary Examiner*—Reinhard J. Eisenzopf
*Assistant Examiner*—Kinfe-Michael Negash
*Attorney, Agent, or Firm*—Fitzpatrick, Cella, Harper & Scinto

[57] ABSTRACT

There are provided digital communicating method and apparatus for modulating digital signals into chirp signals and performing the communication. In this method, pulses indicative of digital signals of codes "1" and "0" are modulated, the modulated pulse signals are converted into chirp signals, the chirp signals are converted into the optical signals and output as transmission signals, and the digital signals are input and the pulses based thereon are generated. A wave of a predetermined frequency is multiplied by the pulses indicative of "1" and "0" of the digital signals and the modulation is executed. The communication signals can be converted into the chirp signals by the chirp conversion elements using the surface acoustic wave-dispersive delay lines having different converting characteristics by the simple construction. On the reception side, the modulated signals are demodulated by the chirp conversion elements having characteristics opposite to those of the chirp conversion elements on the transmission side. Thus, the code signals of "1" and "0" can be accurately discriminated and the error rate can be reduced. The communication reliability is improved.

23 Claims, 12 Drawing Sheets

FIG. 2A
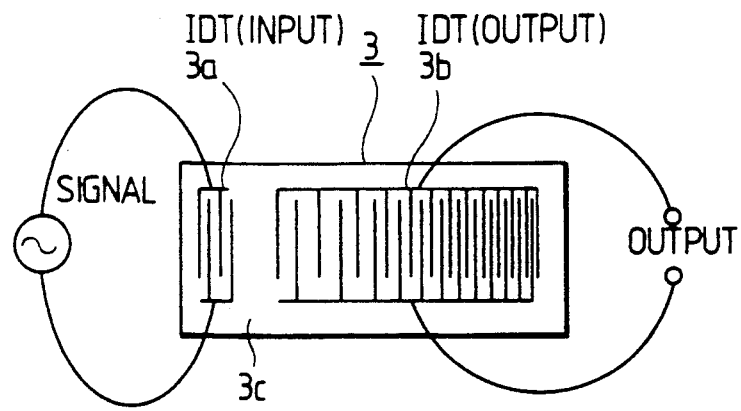
FIG. 2B
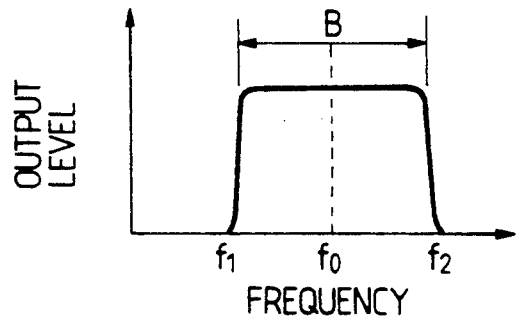
FIG. 2C
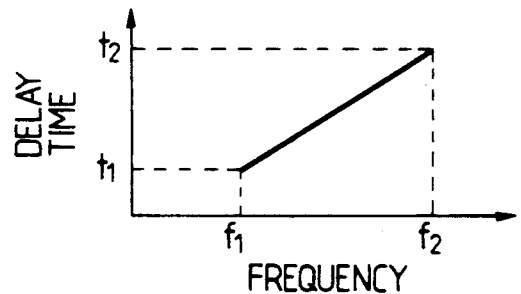
FIG. 2D  INPUT WAVESHAPE
FIG. 2E  OUTPUT WAVESHAPE
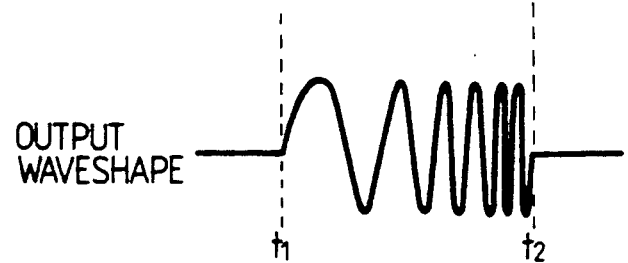

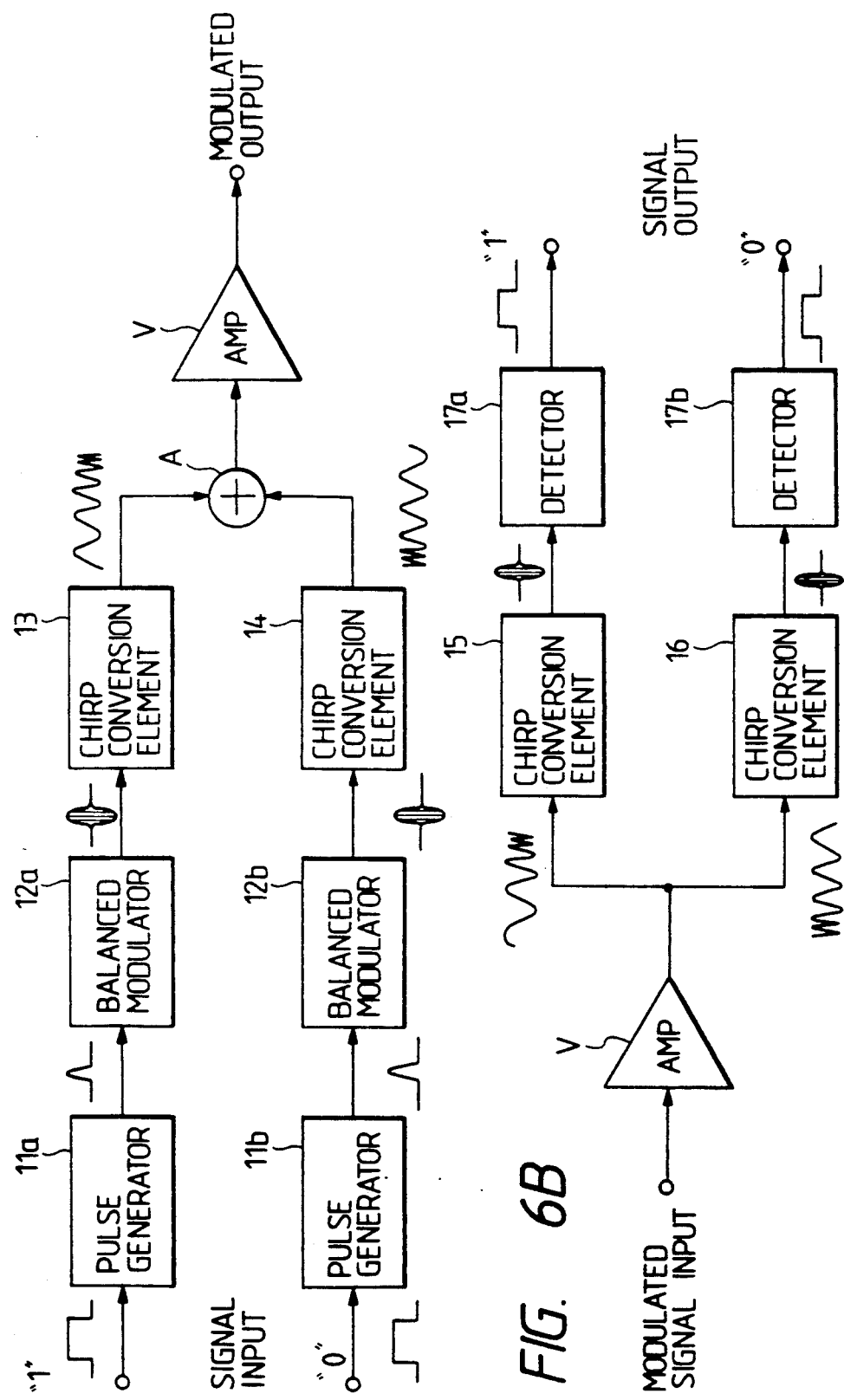

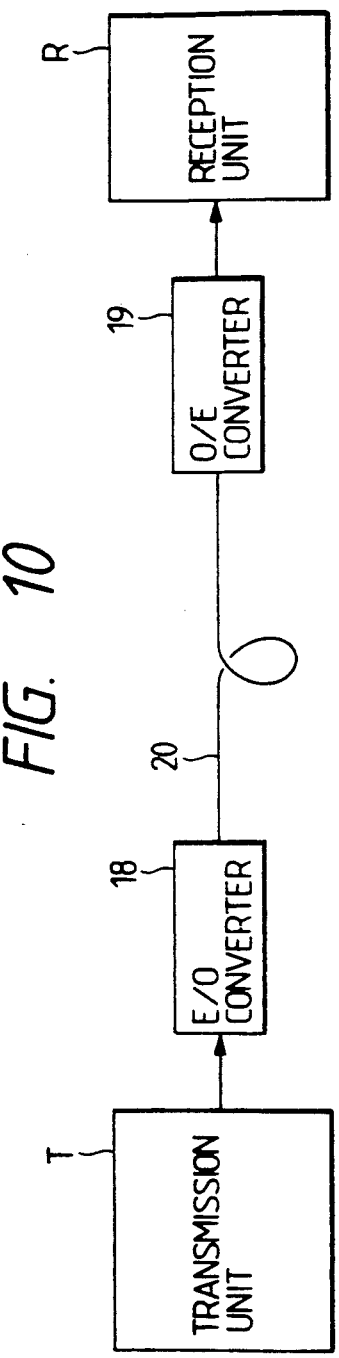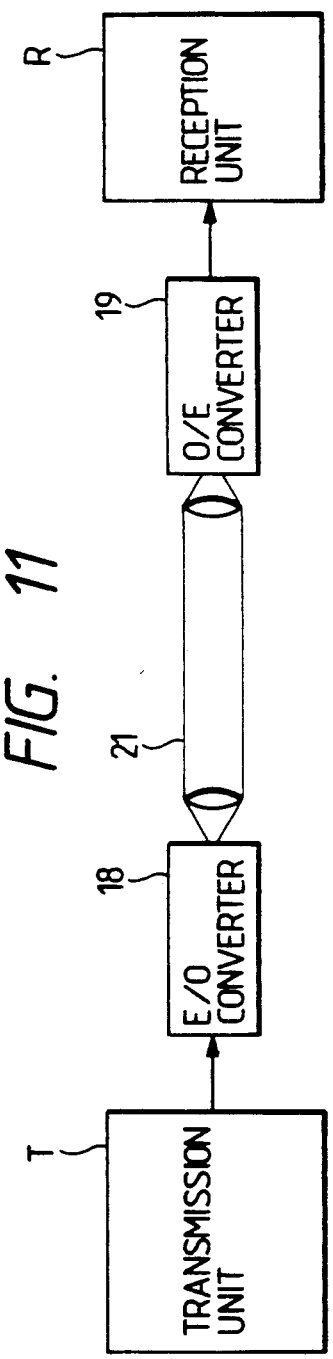

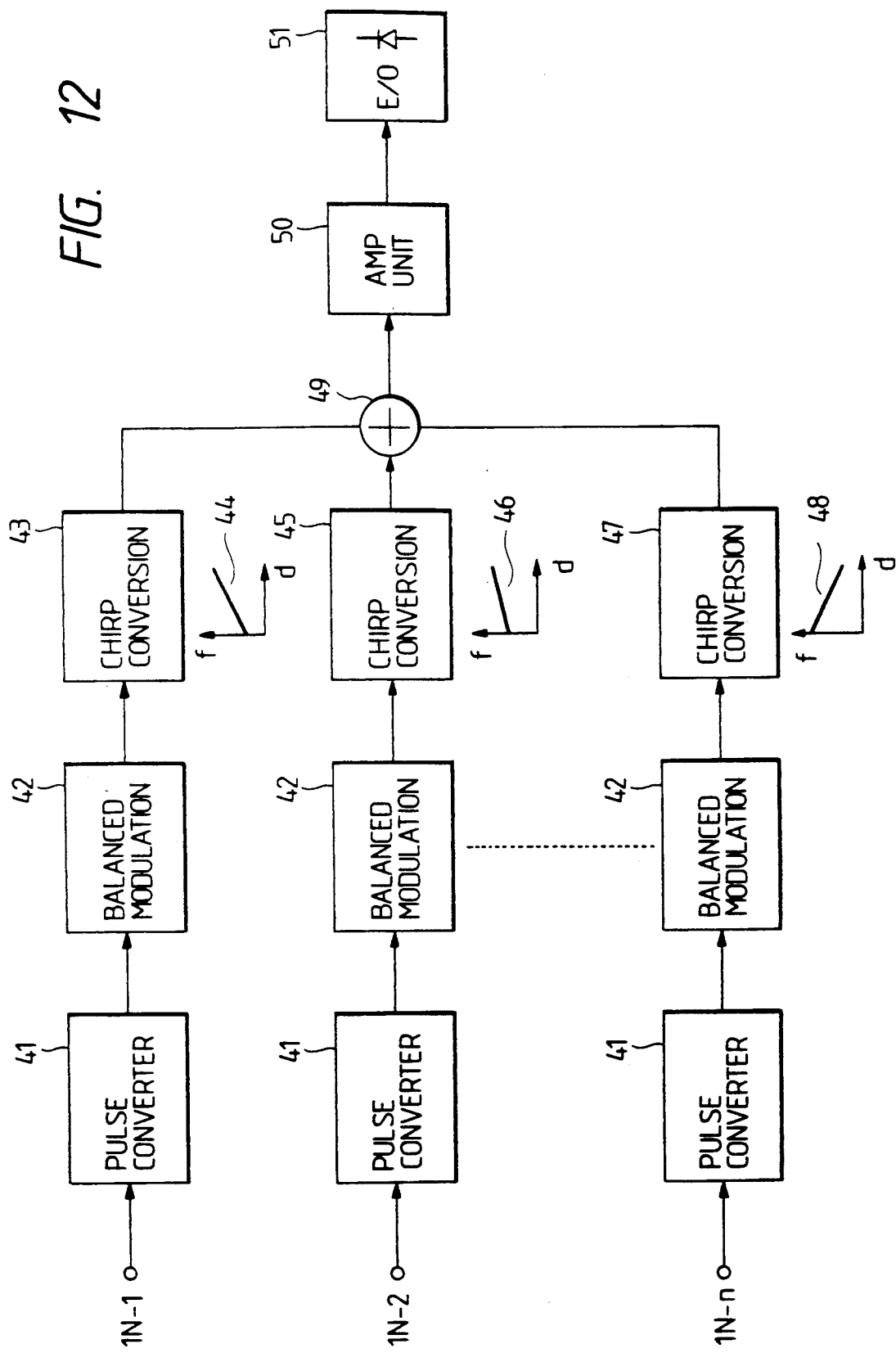

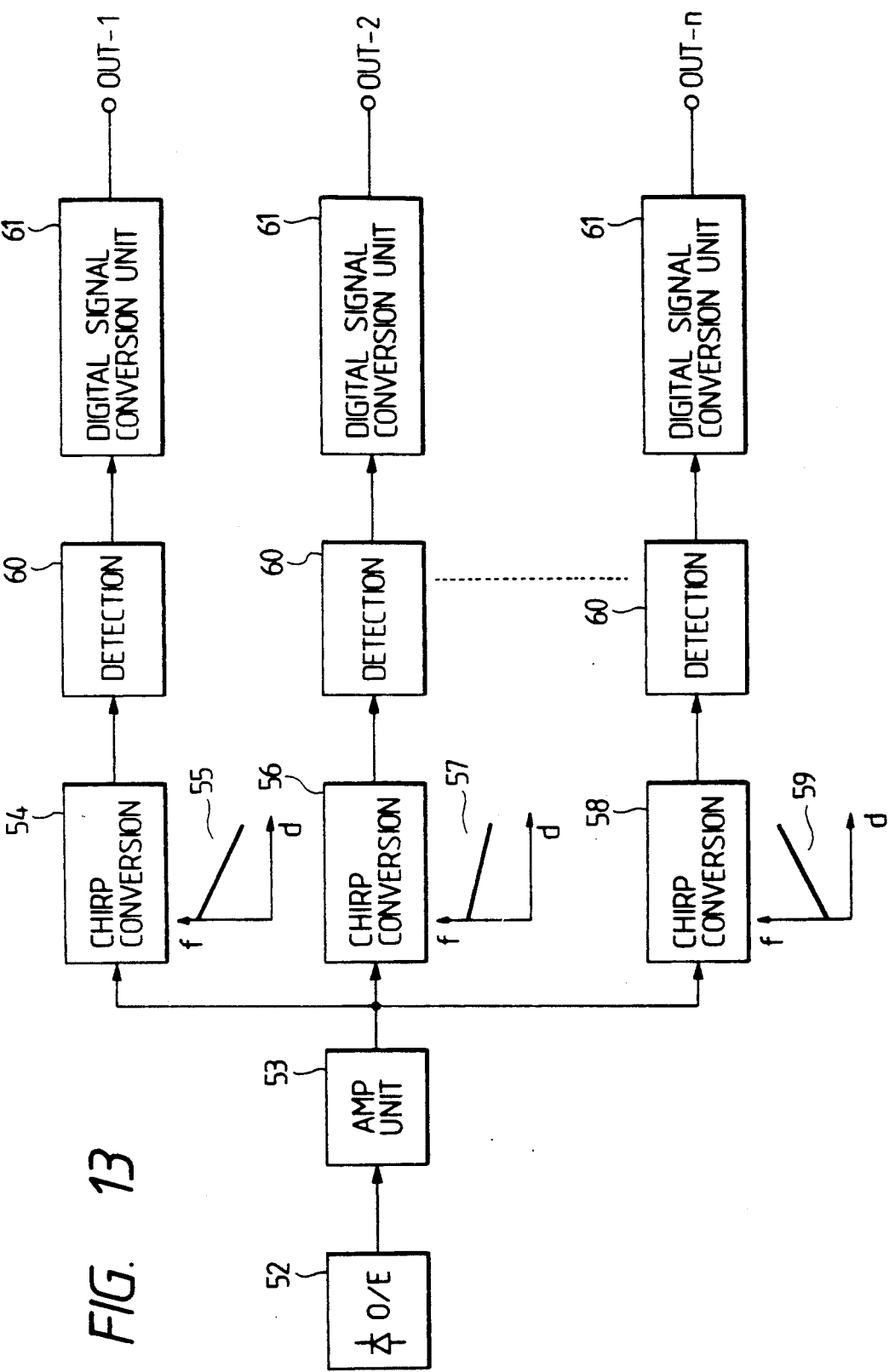

DIGITAL COMMUNICATING METHOD AND APPARATUS

BACKGROUND OF THE INVENTION

1. Field of the Invention

The present invention relates to digital communicating method and apparatus and, more particularly, to digital communicating method and apparatus for modulating a digital signal into a chirp signal and communicating.

2. Related Background Art

Hitherto, as a method of modulating a digital signal and transmitting, there has widely been used a frequency shift keying modulation system (FSK) in which two different frequencies are prepared and are transmitted in a form of a frequency change by making them correspond to "1" and "0" of the binary digital signal or a phase shift keying modulation system (PSK) in which "1" and "0" of the digital signal are made correspond to a phase change of a carrier, or the like.

The FSK is the modulation system in which frequencies $f_1$ and $f_2$ of the carrier are assigned to "1" and "0" of the digital signal, respectively, and on the reception side, "1" and "0" of the signal are discriminated by detecting the frequency of the signal. On the other hand, the PSK is the modulation system in which phases $\phi_1$ and $\phi_2$ of the carrier are assigned to "1" and "0" of the digital signal, and on the reception side, the phase of the signal is detected.

Although the quality of the digital communication is generally evaluated by a code error rate, in the above modulation systems, the code error rate depends on the ratio (C/N ratio) of an electric power of the carrier of the signal to the noises. As the C/N ratio decreases when the signal becomes very weak, the code error rate promptly deteriorates. Therefore, in the conventional modulation systems such as FSK, PSK, and the like, in order to guarantee the necessary code error rate, it is necessary to keep the C/N ratio of a predetermined value or more. Thus, there is a drawback such that the adaptive range of the transmission is limited by such a necessity.

On the other hand, hitherto, the optical spatial communication for performing the communication by using the atmospheric propagation of the optical signal has been known. In the optical spatial communication, since it is easily influenced by the characteristic disturbance of the transmission path called an open space, it is a general way that the signal is subjected to an arbitrary modulation and is transmitted rather than it is directly transmitted in the original form.

In the case of the optical spatial communication, when the transmission of a long distance is executed in the open air or the like, the signal light is largely attenuated in dependence on the weather conditions such as rainfall or the like. Therefore, it is necessary to detect a very weak signal. In the conventional modulation systems such as FSK, PSK, and the like, the communication distance is limited and there is also a problem of the reliability.

On the other hand, as an optical spatial communication of a short distance, it is considered to diffuse the signal light to enlarge the space range where the signal can be received instead of the communication of the one-to-one corresponding relation. However, even in such a case, since the signal light level becomes very small, there is a drawback such that it is also similarly difficult to keep the communication reliability according to the conventional transmission systems.

On the other hand, hitherto, a system such as frequency multiplex, time-sharing multiplex, wavelength multiplex, or the like has been used as a system for multiplexing digital signals and transmitting.

The frequency multiplex system relates to a method whereby signals which were modulated with an occupation band width are arranged and multiplexed on the frequency base at a frequency interval such as not to overlap the signals. On the other hand, the timesharing multiplex system relates to a method whereby a plurality of digital signals which are input by the digital transmission are multiplexed as a pulse train in which they are arranged on the time base at a predetermined time interval.

On the other hand, the wavelength multiplex system relates to a method whereby it is executed by the optical communication, information is added to lights of different wavelengths, the lights are transmitted by the same transmission path, and thereby multiplexing.

A proper one of the above various kinds of multiplex transmission systems is selected in accordance with the content, specifications, and the like of a system which is constructed. However, the above conventional multiplex transmission systems need the advanced techniques in the signal multiplex and the separation of the multiplexed signal and its construction is also complicated. There are also problems such that the multiplexing apparatus and the demultiplexing apparatus are large in size and expensive.

SUMMARY OF THE INVENTION

It is an object of the present invention to eliminate the drawbacks in the foregoing conventional techniques and to provide a digital communicating system which is suitable for the optical communication.

Another object of the invention is to provide a digital communicating system wherein the influence by the noises can be reduced and a very low level signal can be detected.

Still another object of the invention is to provide a digital communicating system wherein by using a surface acoustic wave-dispersive delay line, a communication signal can be converted into a chirp signal by a simple construction.

Further another object of the invention is to provide a digital communicating system wherein the S/N ratio in the optical communication can be improved and the communication reliability can be also improved.

Further another object of the invention is to provide a digital communicating system wherein by converting digital signals of "1" and "0" into chirp signals having different characteristics and communicating, the discriminating capability of the "1" and "0" signals can be improved and the error rate can be reduced.

Further another object of the invention is to provide a digital communicating system wherein when signals of a plurality of channels are multiplexed and communicated, by converting communication signals into the chirp signals having different characteristics in every channel, the multiplex communication can be cheaply executed by a simple construction.

The above and other objects and features of the present invention will become apparent from the following detailed description and the appended claims with reference to the accompanying drawings.

BRIEF DESCRIPTION OF THE DRAWINGS

FIGS. 2A to 2E are explanatory diagrams showing a structure and characteristics of a chirp conversion element for expansion;

FIG. 6A is a block diagram showing a transmission unit of the digital communication system according to the second embodiment of the invention;

FIG. 6B is a block diagram showing a reception unit in the second embodiment;

FIGS. 10 and 11 are block diagrams showing different embodiments of the second embodiment;

FIG. 12 is a block diagram of a transmitting apparatus to which the third embodiment of the invention is applied;

FIG. 13 is a block diagram of a receiving apparatus which is used together with the transmitting apparatus of FIG. 12.

DETAILED DESCRIPTION OF THE PREFERRED EMBODIMENTS

Figure 1A:
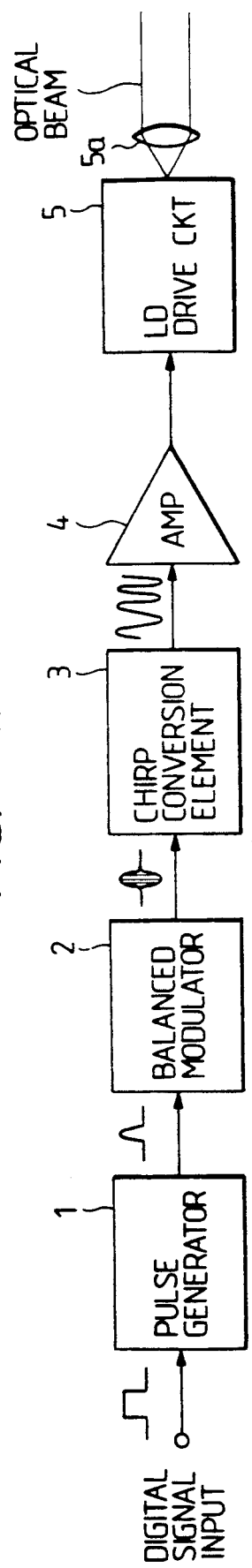
FIG. 1A is a block diagram showing a structure of a transmission unit in the first embodiment of the present invention.

The present invention will be described in detail hereinbelow on the basis of embodiments shown in the drawings.

First Embodiment

Figure 1B:
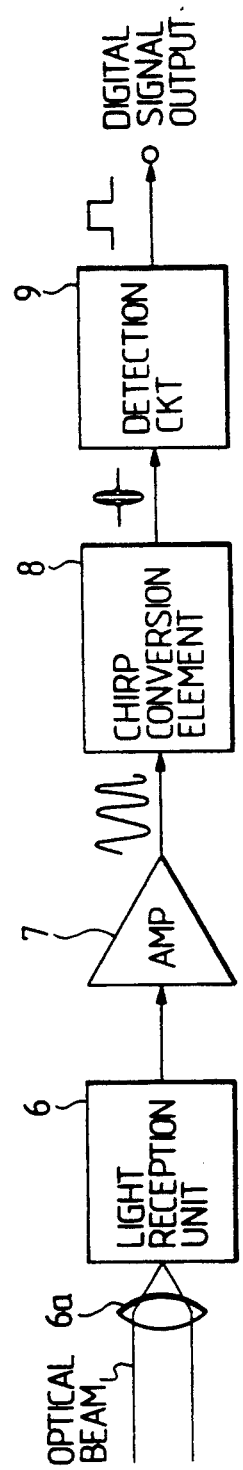
FIG. 1B is a block diagram showing a structure of a reception unit in the first embodiment.

FIGS. 1A and 1B show block diagrams of a transmission unit and a reception unit in a digital communicating apparatus using the spatial optical beam transmission to which the invention is applied, respectively.

In FIG. 1A, reference numeral 1 denotes a pulse generator for generating pulses of a single wavelength component as will be explained hereinlater in accordance with digital signals to be transmitted. The pulses are input to a balanced modulator 2. A sine wave of a single frequency is multiplied by the pulse signal from the pulse generator 1 and the balanced modulation is executed. The modulation output is input to an expanding chirp conversion element 3 to expand in a time manner the spectrum of the modulation output to convert it into the chirp signal. Thereafter, the chirp signal is amplified by an amplifier 4 and is input to a laser diode (LD) drive circuit 5. The LD drive circuit 5 converts the input signal into the optical signal. The optical signal is generated into the space through an optical system 5a.

On the other hand, in the reception unit of FIG. 1B, reference numeral 6 denotes a light reception unit comprising a PIN photodiode or the like. The reception signal is amplified by an amplifier 7 and is input to a compressing chirp conversion element 8 to compress the spectrum in a time manner. A compressed conversion output of the chirp conversion element 8 is detected by a detection circuit 9 based on the envelope detection or sync detection system, so that a transmission digital signal is reproduced.

In the transmission unit of FIG. 1A, pulses of a proper waveshape are produced from the input digital signal and are converted into the chirp signal by the expanding chirp conversion element. The LD is modulated by the chirp signal and the signal is transmitted in a form of a laser beam.

In the reception unit of FIG. 1B, the light beam is converged by an optical system $6a$ and the chirp optical signal is detected and amplified. Thereafter, the amplified signal is inversely converted into the compression pulses by the compressing chirp conversion element. Further, the pulses are transmitted through the detection circuit and demodulated to the original digital signals.

Figure 3A:
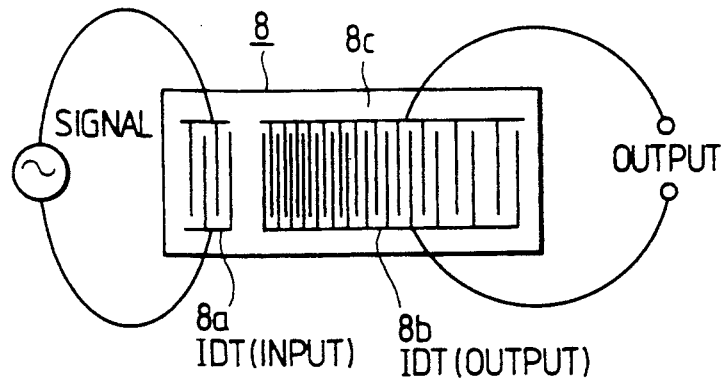
FIG. 3A to 3E are explanatory diagrams showing a structure and characteristics of a chirp conversion element for compression.

FIGS. 2A to 2E and 3A to 3E show the operation principle of the chirp conversion elements constructed by using the surface acoustic wave-dispersive delay line as an example of the chirp conversion elements which are used in the embodiment. FIG. 2A shows the chirp conversion element 3 for expansion in FIG. 1A. FIG. 3A shows the chirp conversion element 8 for compression in FIG. 1B.

As shown in FIG. 2A, the expanding chirp conversion element 3 has a structure in which inter digital transducers (hereinafter, abbreviated as IDTs) $3a$ and $3b$ are arranged on a piezoelectric substrate $3c$ having a piezoelectric effect. When an electric signal is applied to the IDT $3a$ in the signal input unit, a mechanical vibration occurs by the piezoelectric effect and the surface wave of the vibration is propagated on the substrate $3c$.

When the surface wave arrives at the IDT $3b$ in the output unit, it is again converted into the electric signal. Although the IDT $3b$ on the output side generates the electric signal synchronously with the oscillating frequency which is determined by the interval between electrodes, since the interval between the IDTs in the output unit densely changes as they are away from the input IDT as shown in the diagram, the delay time of the output signal differs depending on the frequency.

That is, the different frequency components in the signal are separated in a time manner. FIGS. 2B and 2C show characteristics of the amplitude and delay of the output to the input frequency of the chirp conversion element for expansion. Namely, in at least the frequency region (band width B) from $f_1$ to $f_2$ around the center frequency of $f_0$, the frequency characteristics are flat. On the other hand, the delay time linearly increases ($t_1$ to $t_2$) from the frequency $f_1$ to the frequency $f_2$ due to the arrangement of the electrodes.

Therefore, when a pulse-like signal as shown in FIG. 2D including the high frequency components having the spectrum components existing in a wide range from $f_1$ to $f_2$ is input to the expanding chirp conversion element 3, the frequency is expanded to the waveform (chirp signal) which continuously changes from $f_1$ to $f_2$ for the time interval from $t_1$ to $t_2$ as shown in FIG. 2E and is output.

Figure 4:
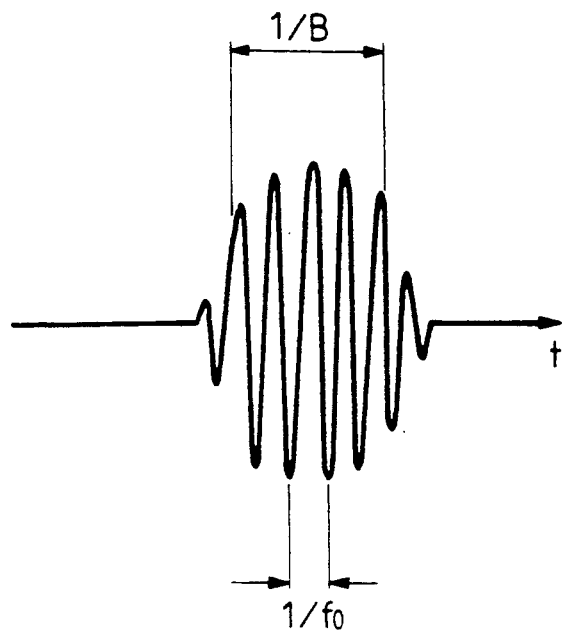
FIG. 4 is a waveform diagram showing an input pulse waveform of the chirp conversion element for expansion.

FIG. 4 shows the details of a pulse waveform of FIG. 2D and has a waveshape such that the signal of the frequency $f_0$ was multiplied to a single pulse waveform (as shown in FIG. 4) of a time half value width $1/B$. Such a waveshape approximately satisfies the spectrum condition as shown in FIG. 2B. The input waveform to the expanding chirp conversion element 3 in FIG. 1A is formed by the amplitude modulation of the balanced modulator 2.

Figure 3B:
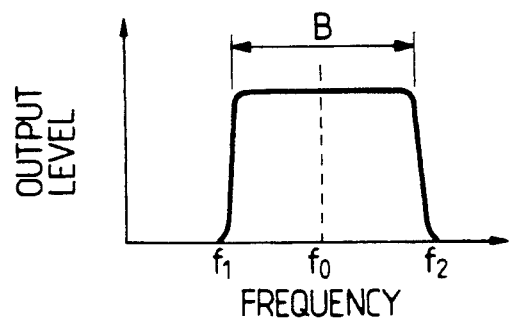
Figure 3C:
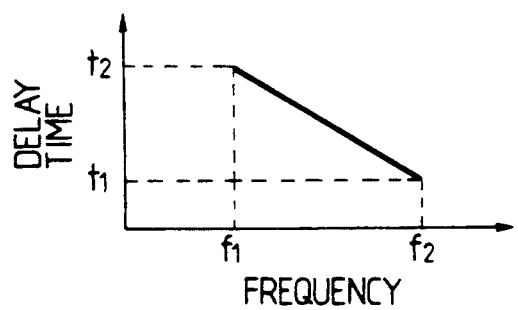

On the other hand, as shown in FIG. 3A, in the chirp conversion element 8 for compression, the dense structure of IDTs 8a and 8b is opposite to that in the chirp conversion element 3 for expansion. Therefore, although the chirp conversion element 8 has the same amplitude characteristic as that of the chirp conversion element 3 as shown in FIG. 3B, the delay characteristic between the frequencies $f_1$ and $f_2$ is opposite to that of the element 3 as shown in FIG. 3C.

Figure 3D:
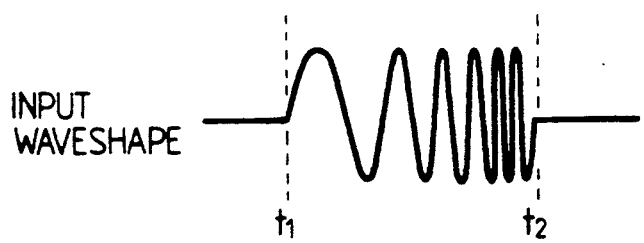
Figure 3E:
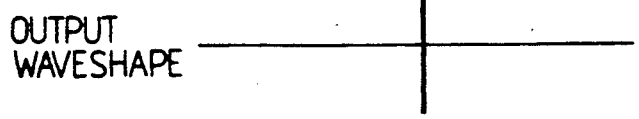

Therefore, for the input of the chirp signal whose frequency continuously changes from $f_1$ to $f_2$ for the time interval from $t_1$ to $t_2$ as shown in FIG. 3D which was generated by the expanding chirp conversion element 3, a pulse signal as shown in FIG. 3E (in detail, the waveform of FIG. 4) is reproduced.

A conversion gain from the chirp signal to the pulse signal can be evaluated by the product (BT product) of the continuation time of the chirp signal and the band width. The BT product is generally fairly larger than 1. For instance, assuming that B=10 MHz and T=20 $\mu$sec, the value of BT=200 and the chirp signal is compressed to the pulse signal having the peak electric power which is BT times larger than the electric signal of the chirp signal.

Therefore, by using the chirp conversion system, the S/N ratio of the reception can be remarkably improved. On the other hand, since the chirp conversion element does not respond to the signals other than the chirp signal having the same pattern as the characteristic of the element, even if the random noises or impulse-like noises are input to the reception unit, they are different from the pattern of the conversion element, so that the element does not respond and is not influenced. Therefore, the very weak signal included in the noises which could not be detected by the conventional system can be also detected and reproduced. On the other hand, since the repetitive frequency of the pulses is ordinarily smaller than the continuation time of the chirp signal, the chirp signals overlap each other. However, since the coincidence of the patterns is detected, the overlap of the chirp signals does not become an obstacle.

The operation of each section of the embodiment of FIGS. 1A and 1B will now be described. The waveform in each section is also shown in FIGS. 1A and 1B.

The input digital signal is converted into the pulse signal having the time half value width of $1/B$ by the pulse generator 1 and, thereafter, the pulse signal is amplitude modulated by the balanced modulator 2 and is converted into the pulse signal including the component of the frequency $f_0$ as shown in FIG. 4.

The signal in which the spectrum was expanded in the direction of the time base is converted into the chirp signal whose frequency changes from $f_1$ to $f_2$ for the time interval from $t_1$ to $t_2$ as mentioned above by the expanding chirp conversion element 3 having the characteristics as shown in FIGS. 2B and 2C. The chirp signal is amplified to the voltage enough to drive the LD drive circuit 5 by the amplifier 4. By luminance modulating the LD irradiation light by the LD drive circuit 5, it is converted into the optical signal and is generated into the air through the optical system 5a.

The LD irradiation light including the optical signal is converted into the parallel light beam by the optical system 5a and is irradiated into the air. The light beam which was transmitted in the air and attenuated is converged by the optical system 6a in the light reception unit 6 and the optical signal is converted into the electric signal by the light reception unit 6.

After the electric signal was amplified by the amplifier 7, it is transmitted through the compressing chirp conversion element 8 having the characteristics shown in FIGS. 3B and 3C, so that it is time compressed as mentioned above and is returned to the pulse signal including the component of the frequency $f_0$.

The pulse signal is detected and waveform shaped by the detection circuit 9 and is demodulated to the original digital signal and output. The signal detection is executed by the envelope detection or the sync detection by extracting the $f_0$ component.

Generally, in the light beam communication of a long distance using the atmospheric propagation of the optical signal, since the space is used as a transmission path, there is a drawback such that the communication is largely influenced by the weather conditions such as rainfall and the like, fluctuation of the atmosphere, attenuation or fluctuation of the signal due to the fluctuation or the like of the disturbance light, and the like as mentioned above.

Therefore, when the transmission distance becomes long, the signal is largely attenuated and the communication cannot be executed under the bad conditions such as rainfall, snowfall, fog, or the like. On the other hand, according to the present system in which the chirp signal is transmitted, the influence by the disturbance noises can be reduced as mentioned above and the S/N ratio which is BT times larger than that in the conventional system is obtained. Therefore, a very weak signal which was subjected to the large attenuation can be also detected and the reliability can be improved and the transmission of a long distance can be realized.

On the other hand, in the above embodiment, the conversion into the chirp signal and the inverse conversion from the chirp signal are executed by the dispersive delay means by the surface acoustic wave-dispersive delay line. Such a conversion element has advantages such that the structure is simple and the construction of the apparatus can be simplified and the cost, size, and weight thereof can be reduced.

Figure 5:
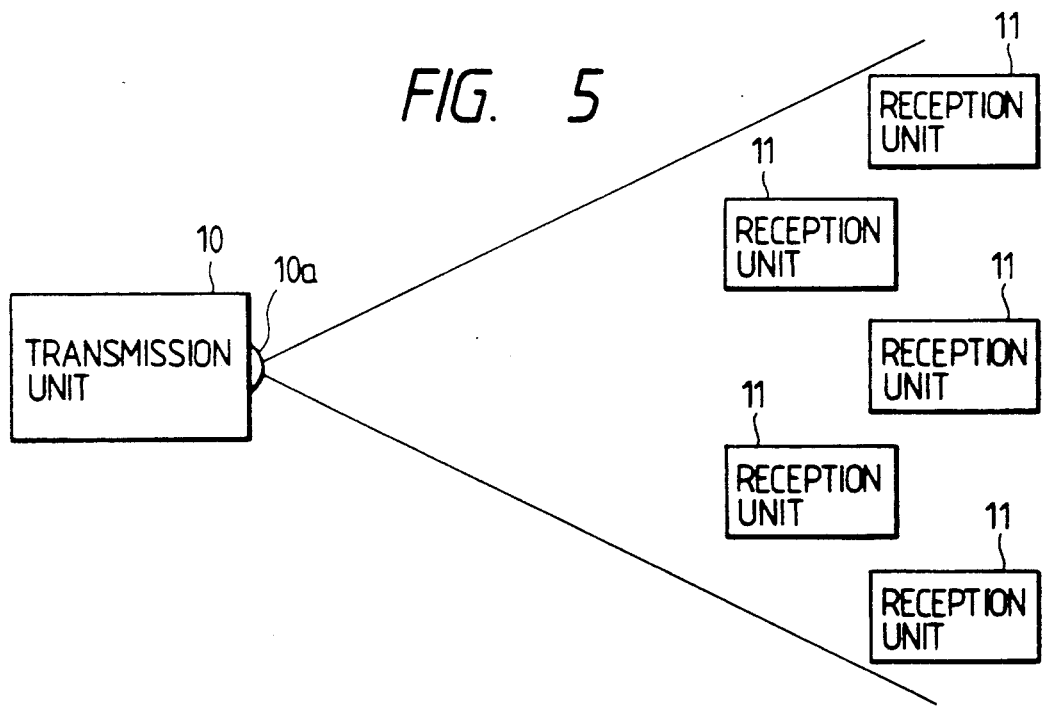
FIG. 5 is a diagram showing an example in which the first embodiment is applied to the optical communication of a short distance.

The long distance light beam communication system in the embodiment of FIGS. 1A and 1B relates to the communication in the one-to-one corresponding relation such that one reception unit is provided for one transmission unit. However, in the optical spatial communication of a relatively short distance, as shown in FIG. 5, there is considered a system in the one-to-n corresponding relation such that an irradiation angle of the light beam of a transmission unit 10 is widened by a diffusion optical system 10a and reception units 11 are arranged at a plurality of (n) locations for one transmission unit.

According to such a system, since the light is diffused to widen the range where the signal can be received, in the conventional system, the optical signal in each of the reception units becomes very weak and it is difficult to realize the receiving sensitivity which is necessary to execute a high speed digital transmission in a wide range. However, if the optical signal produced by using the chirp signal as mentioned above is diffused and transmitted, even the very weak chirp signal included in the noises can be reproduced, so that the transmission in a wide range can be accomplished.

In addition to the transmission in the open space, the invention can be also applied to the optical signal transmission in an optical fiber or the like.

As will be obvious from the above description, according to the first embodiment of the invention, in the optical communication system for transmitting and receiving the signal light between the transmission unit and the reception unit and for transmitting the digital data, in the transmission unit, the carrier of a predetermined frequency is modulated by the pulses which express the transmission digital signal, the light modulation is executed by the chirp signal in which the spectrum component of the modulated signal was expanded in the time base direction, and the signal light is formed and output, on the other hand, in the reception unit, the spectrum of the chirp signal obtained by photoelectrically converting the received signal light is compressed in the time base direction and, thereafter, it is detected and the digital data is reproduced. Therefore, when the chirp signal is compressed on the reception side, the same effect as that in the case of increasing the transmission energy is derived. The S/N ratio can be apparently improved. Therefore, even the very weak signal which cannot be detected and reproduced by the conventional FSK or PSK modulation system can be detected and reproduced and the reliability of the communication can be improved. Therefore, the communication can be certainly executed not only in the long distance communication system but also the system in which the signal light is diffused so that a number of reception units can receive the signals.

Second Embodiment

The first embodiment has been described with respect to an example in which "1" of the digital signal is converted into the chirp signal and transmitted and, on the reception side, the received chirp signal is converted into the digital value "1". As the second embodiment, an explanation will now be made with regard to an example in which the digital values "1" and "0" are respectively converted into chirp signals having different frequency/time characteristics and transmitted and, on the reception side, the received chirp signal is converted into the digital values "1" and "0".

FIGS. 6A and 6B show the embodiment of the transmission system according to the invention. FIG. 6A is a block diagram of a transmission unit. In the diagram, reference numerals 11a and 11b denote pulse generators. For instance, the pulse generators 11a and 11b receive digital pulses of a square wave as shown in the diagrams corresponding respectively to binary values of "1" and "0" and generate pulses of a single wavelength as will be explained hereinlater. The pulses are respectively input to balanced modulators 12a and 12b. The carrier of a predetermined frequency $f_0$ is amplitude modulated. The modulated output is input to chirp conversion elements 13 and 14 having different characteristics, respectively.

As will be explained hereinlater, the chirp conversion elements 13 and 14 expand the frequency components of the input signals in the time base direction. At this time, the expanding characteristics of the chirp conversion elements 13 and 14 are different as shown in the diagram. For instance, in the case of the chirp conversion element 13, the high band side is delayed. In the case of the chirp conversion element 14, the low band side is delayed.

After outputs of the chirp conversion elements 13 and 14 were added by an adder A, the added signal is amplified by an amplifier V and is converted into the signal such as radio wave, light, or the like and is output to the transmission path.

On the other hand, FIG. 6B is a block diagram of a reception unit. The received signal is input to chirp conversion elements 15 and 16 through an amplifier V. The chirp conversion elements 15 and 16 have the characteristics opposite to those of the chirp conversion elements 13 and 14, respectively. The chirp conversion elements 15 and 16 compress the frequency components in the time base direction and reproduce amplitude modulated waveshapes as shown in the diagram. Thereafter, the rectangular wave pulses corresponding to the original binary values "1" and "0" are reproduced by detectors 17a and 17b on the basis of the sync detection system or the like.

Figure 7A:
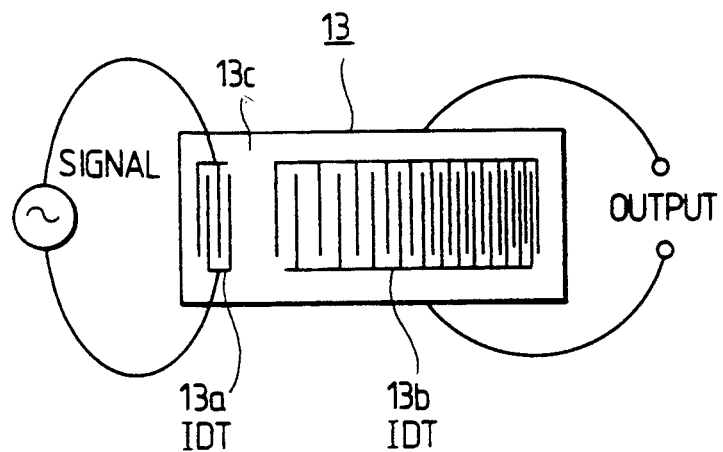
FIGS. 7A to 7D and 8A to 8D are explanatory diagrams showing structures and characteristics of chirp conversion elements.
Figure 7B:
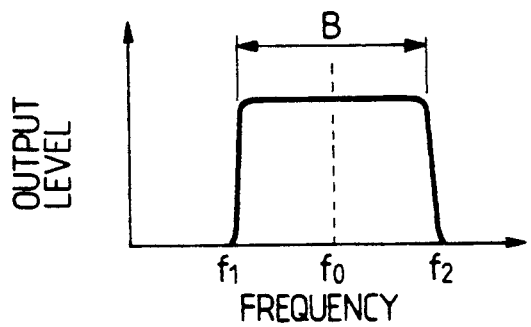
Figure 7C:
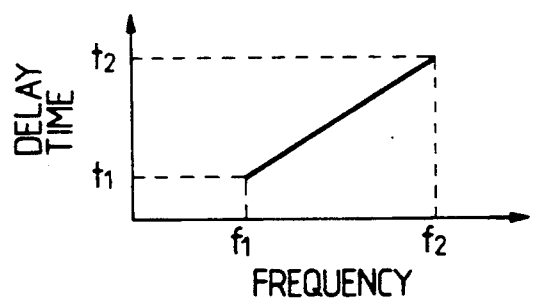

The construction and operations of the chirp conversion elements will now be described. FIGS. 7A to 7D and 8A to 8D show the operation principles of the surface acoustic wave-dispersive delay line as an example of the chirp conversion elements which are used in the embodiment. FIG. 7A shows the chirp conversion element 13 in FIG. 6A. FIG. 8A shows the chirp conversion element 14 in FIG. 6A.

As shown in FIG. 7A, the chirp conversion element 13 has a structure in which inter digital transducers (hereinafter, abbreviated to IDTs) 13a and 13b are arranged on a piezoelectric substrate 13c having the piezoelectric effect. When an electric signal is applied to the IDT 13a in the signal input unit, the mechanical vibration occurs due to the piezoelectric effect and the surface wave of the vibration is propagated on the substrate 13c.

When the surface wave arrives at the IDT 13b in the output unit, it is again converted into the electric signal. The IDT 13b on the output side generates the electric signal synchronously with the oscillating frequency which is determined by the interval between the electrodes. However, as shown in the diagram, since the interval between the IDTs in the output unit densely changes as the output side IDT is away from the input IDT, the delay time of the output signal differs depending on the frequency.

That is, the different frequency components in the signal are separated in a time manner. FIGS. 7B and 7C show the characteristics of the amplitude and delay time of the output to the input frequency of the chirp conversion element for expansion. That is, the frequency characteristic is flat in at least the region from the frequency $f_1$ to the frequency $f_2$. On the other hand, the delay time linearly increases ($t_1$ to $t_2$) from the frequency $f_1$ toward the frequency $f_2$ due to the arrangement of the electrodes.

Figure 7D:
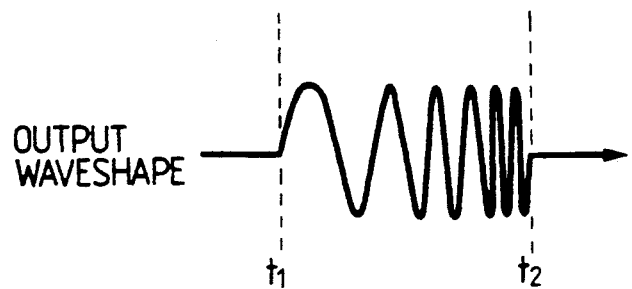
Figure 8A:
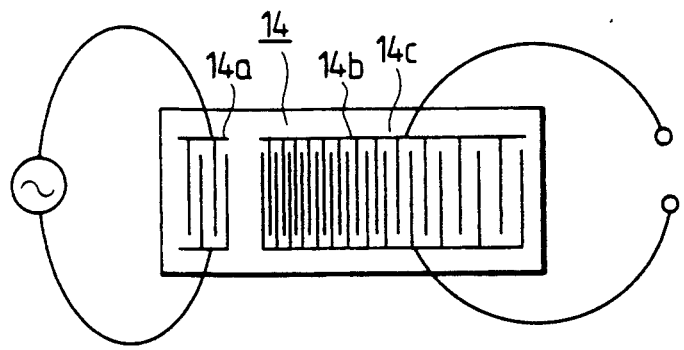

Therefore, when a pulse-like signal including the high frequency component having the spectrum component existing from $f_1$ to $f_2$ is input to the expanding chirp conversion element 13, the signal waveform is expanded to the waveform (chirp signal) whose frequency continuously changes from $f_1$ to $f_2$ for the time interval from $t_1$ to $t_2$ as shown in FIG. 7D and is output.

Figure 8B:
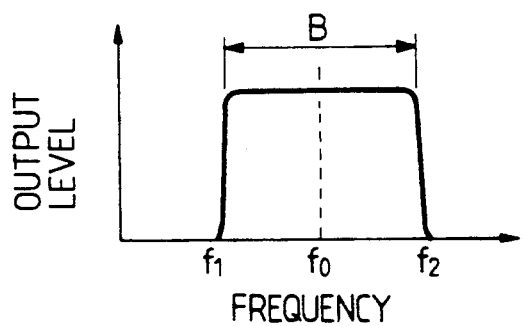
Figure 8C:
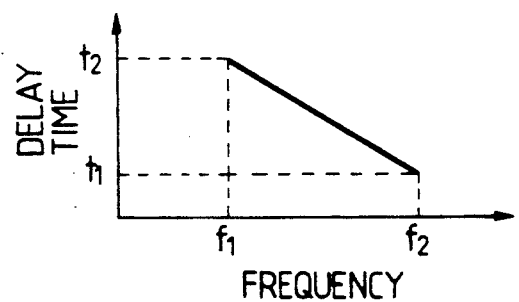
Figure 8D:
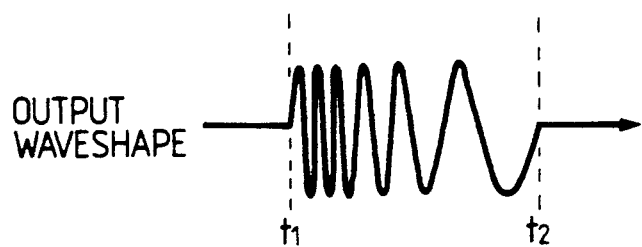

On the other hand, FIGS. 8A to 8D show the chirp conversion element 14 in FIG. 6A. An electrode structure of IDTs 14a and 14d on a substrate 14c has a dense state opposite to that in FIG. 7A as shown in FIG. 8A, so that the characteristics of the output amplitude and the delay time to the frequency are as shown in FIGS. 8B and 8C. That is, although the amplitude characteristic is the same as that shown in FIG. 7B, the delay characteristic on the side of the frequency $f_1$ is larger than that shown in FIG. 7B. Therefore, as shown in FIG. 8D, the output waveform to the input impulse signal results in the chirp signal whose frequency changes from $f_2$ to $f_1$ in a manner opposite to the case of FIG. 7D.

Since the input pulse waveform is the same as shown in FIG. 4, its description is omitted.

In the reception unit, when the chirp signal is returned to the pulse signal, by inputting the signal of FIG. 7D to the chirp conversion element 15 having the characteristics shown in FIGS. 8B and 8C, the chirp signal is compressed by the inverse conversion and is returned to the original pulse signal as shown in FIG. 4. On the other hand, by inputting the signal of FIG. 8D to the chirp conversion element 16 having the characteristics as shown in FIGS. 7B and 7C, the chirp signal is similarly compressed by the inverse conversion and is returned to the original pulse signal.

The conversion gain from the chirp signal to the pulse signal can be evaluated by the product (BT product) of the continuation time and the band width of the chirp signal. In the case of using the chirp conversion, the BT product is generally fairly larger than 1. For instance, assuming B=10 MHz and T=20 nsec the value of BT=200. The chirp signal is compressed to the pulse signal having the peak electric power which is BT times larger than the electric power of the chirp signal. Therefore, by using the chirp conversion, the S/N ratio of the reception can be remarkably improved and even the very weak chirp signal included in the noises can be reproduced.

The reception S/N ratio can be improved by modulating and demodulating the signal by using the chirp conversion element. In the invention, as shown in FIGS. 6A and 6B, the codes "1" and "0" of the digital signal are converted into the chirp signals of the patterns which are opposite to each other, thereby enabling the codes "1" and "0" to be further certainly separated and discriminated.

In other words, in the example of FIGS. 6A and 6B, the digital signal which was channel separated to "1" and "0" is converted into the pulses of a proper width and is further converted into the waveshape as shown in FIG. 4 by the balanced modulator. Thereafter, the code "1" is converted into the chirp signal whose frequency changes from $f_1$ to $f_2$ in a time manner as shown in FIG. 7D by the chirp conversion element 13. The code "0" is converted into the chirp signal whose frequency contrarily changes from $f_2$ to $f_1$ as shown in FIG. 8D by the chirp conversion element 14.

In the reception unit, the chirp signal of FIG. 7D corresponding to the code "1" is transmitted through the chirp conversion element 15 having the characteristics of FIGS. 7B and 7C, so that it is converted into the compressed pulses as shown in FIG. 4. On the other hand, the chirp signal of FIG. 8D corresponding to the code "0" is converted into the compressed pulses by the chirp conversion element 16 having the characteristics shown in FIGS. 8B and 8C. In this manner, the signal is separated and detected. The respective compressed pulses are returned to the original digital signals by the detectors 17a and 17b. The detection is executed by the envelope detection or the sync detection by reproducing the carrier of the frequency $f_c$. The waveform in each section is also shown in FIGS. 6A and 6B.

Since the chirp conversion elements 15 and 16 in FIG. 6B do not respond to the signals other than the chirp signal having the same pattern as the characteristics of the elements 15 and 16, for instance, the chirp conversion element 15 responds to only the signal having the same pattern as that of the chirp signal shown in FIG. 7D. Even if the chirp signal of the pattern of "0" is input, it is not erroneously detected as the signal of "1". Therefore, since the code discriminating capability is high, the code error generation rate can be also reduced.

Similarly, even if random noises or impulse-like noises are input to the reception unit, since they are different from the patterns of the conversion elements, these elements do not respond to those noises, so that the elements are not influenced by them. Thus, the very weak signal included in the noises which cannot be detected by the conventional system can be also detected.

On the other hand, since the repetitive period of the pulses is generally smaller than the continuation time of the chirp signal, the chirp signals overlap each other. However, since the coincidence of the patterns is detected, the overlap of the chirp signals does not become an obstacle.

On the other hand, the system of the invention does not need a complicated circuit such as a PLL circuit or the like which needs complicated adjustments as in the conventional FSK or PSK system and has a feature such that the certain operation can be obtained by the very simple circuit construction. Particularly, the chirp conversion elements can be easily and cheaply constructed by using the surface acoustic wave-dispersive delay line and its size and weight can be reduced.

In the second embodiment of FIGS. 6A and 6B, two kinds of chirp conversion elements having different characteristics have been used in the transmission unit and reception unit. However, they can be also arranged in a lump on the same substrate as shown in FIGS. 9A and 9B.

Figure 9A:
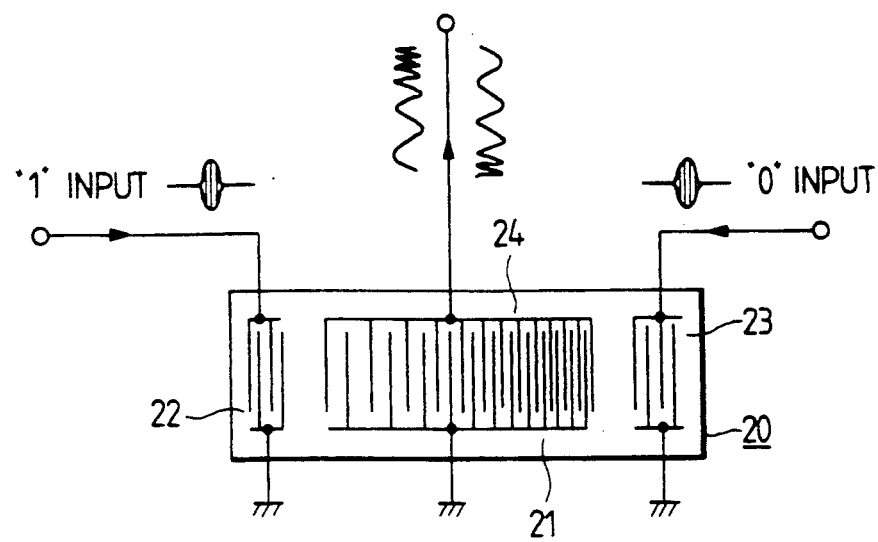
FIGS. 9A and 9B explanatory diagrams showing other structures and a use example of chirp conversion elements.

For instance, as shown in FIG. 9A, a chirp conversion element 20 in the transmission unit is constructed in a manner such that input IDTs 22 and 23 are arranged in both end portions of a substrate 21 and an output IDT 24 is arranged in the central region. As shown in the diagram, the IDT 24 is formed such that the left side to receive the signal of "1" has a wide electrode interval and the right side to receive the signal of "0" has a narrow electrode interval.

With the above construction, when the signal pulse of the code "1" is input from the left IDT 22 and the signal pulse of the code "0" is input from the right IDT 23, the chirp signal whose frequency changes from $f_1$ to $f_2$ is output from the central IDT 24 in correspondence to the code "1", while the chirp signal whose frequency changes contrarily from $f_2$ to $f_1$ is output from the IDT 24 in correspondence to the code "0".

Figure 9B:
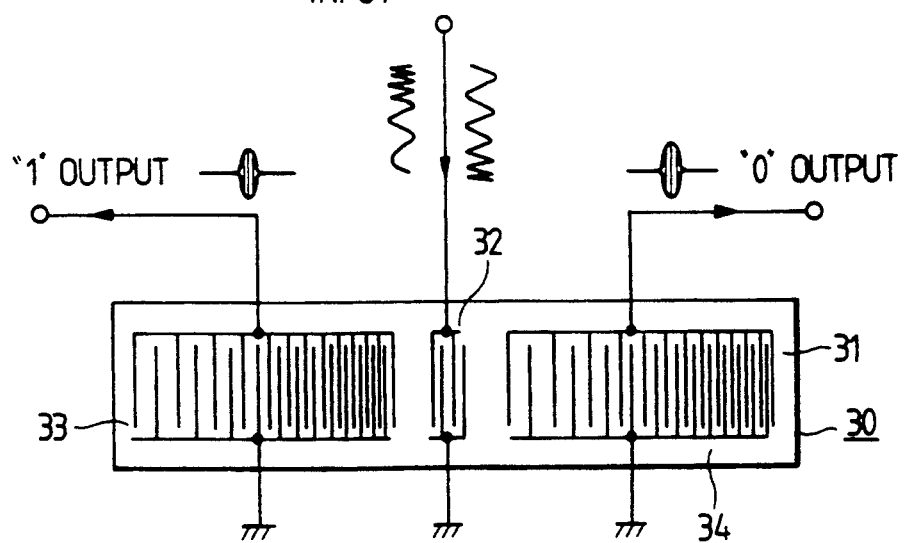

On the other hand, in the reception unit, as shown in FIG. 9B, there is provided an electrode structure in which an input IDT 32 is arranged at the center and output IDTs 33 and 34 having opposite electrode dense states in the directions toward the central IDT 32 are arranged in both end portions. BY inputting the chirp signal to the central IDT, the left or right IDT in the diagram responds in accordance with the patterns of the chirp signals corresponding to the codes "1" and "0" and the signal is distributed.

By using such conversion elements, although the functions are quite the same as those in FIGS. 6A and 6B, the construction of the apparatus is fairly simplified. Particularly, in the transmission unit, since the adder is omitted, the cost, size, and weight can be reduced.

In the embodiment of FIGS. 6A and 6B, only the modulating and demodulating sections of the signal have mainly been shown. However, the above system can be also obviously applied to both of the cable communication and the radio communication.

On the other hand, by together using an apparatus for converting (E/O conversion) the electric signal into the optical signal and an apparatus for converting (O/E conversion) the optical signal into the electric signal, the present system can be also applied to the optical communication. FIG. 10 shows an example of the application of the present system and relates to an embodiment of a communication system using an optical fiber as a transmission path. In the diagram, T and R denote the transmission unit and reception unit in FIGS. 6A and 6B. Reference numeral 18 denotes an E/O converter using a semiconductor laser element or the like; 19 indicates an O/E converter using a PIN photodiode or the like; and 80 shows an optical fiber. The communication of a long distance can be executed by the improvement of the reception S/N ratio.

FIG. 11 shows an example in which the present system is applied to the optical beam communication. In the diagram, T and R denote the transmission unit and reception unit in FIGS. 6A and 6B. Reference numeral 18 denotes the E/O converter comprising a semiconductor laser element or the like; 19 the O/E converter comprising a PIN photodiode or the like; and 21 represents an optical beam. Particularly, in the case of the optical beam communication of a long distance of 1 km or longer, the system is largely influenced by the weather conditions such as rainfall and the like, fluctuation of the atmosphere, attenuation and fluctuation of the signal due to the fluctuation or the like of the disturbance light, and the like. Therefore, the communication reliability can be fairly improved by the eliminating effect of the disturbance noises by the present system.

As will be obvious from the above description, according to the second embodiment, in the digital communication system for converting the binary digital signals of "1" and "0" into predetermined codes and for transmitting and receiving, on the transmission side, the carrier of a predetermined frequency is modulated by the pulses corresponding to the binary digital signals of "1" and "0", and the different chirp signals obtained by expanding the frequency components of the modulated signals in the time base direction by the different expanding characteristics are formed and output, and on the other hand, on the reception side, the frequency components of the received chirp signals are compressed by the opposite compressing characteristics corresponding to the different expanding characteristics and, thereafter, the detection is executed. Thus, the original binary digital data are reproduced. Therefore, the digital values of "1" and "0" are converted into the chirp signals having the different frequency/time characteristics and transmitted and, on the other hand, on the reception side, the received chirp signals are inversely converted and the original data can be reproduced. In this case, since the data of "1" and "0" are respectively chirp converted by the different expanding characteristics, even in the case where the components of "1" and "0" are added and transmitted, the code discriminating capability of the channels of "1" and "0" is high. On the other hand, upon demodulation, the signal electric power apparently increases due to the chirp signal compression and the S/N ratio can be improved, so that the communication reliability can be raised. Particularly, there is an excellent advantage such that the communication reliability can be assured even if there are a limitation of the transmitting electric power on the transmission path and a limitation such that large disturbance noises exist as in the optical spatial communication or the like.

Third Embodiment

As the third embodiment, an explanation will now be made with respect to an example in which transmission signals to be multiplexed are chirp converted by different converting characteristics and added to thereby multiple the signals and, on the other hand, in the reception side, the multiplexed signal is separated by inverse converting means of the chirp conversion.

FIGS. 12 and 13 show the third embodiment of the invention. FIG. 12 shows a construction of a transmitting apparatus. FIG. 13 shows a construction of a receiving apparatus.

In FIG. 12, reference numeral 41 denotes n (n channels) pulse converters for converting the digital signals based on the input serial pulses into the pulse signals. The output pulse signals of the pulse converters 41 are likewise input to n balanced modulators 42. By multiplying the high frequency signal (carrier) by the pulse signals in the balanced modulators 42, the amplitude modulation is executed. Therefore, the output spectra of the balanced modulators 42 have the harmonic components corresponding to the input pulse signal waveforms from the pulse converters 41 in which the carrier is used as a center.

The (n) outputs of the balanced modulators 42 are input to (n) chirp conversion elements 43, 45, and 47 and chirp converted. As described in the first and second embodiments, the chirp conversion elements 43, 45, and 47 distribute (expand) the spectra of the input signals on the time base. For instance, if the delay characteristic such that the delay amount on the low frequency component side is set to be small and the delay amount on the high frequency component side is set to be large is used, the spectra of the input signals are developed on the time base.

Moreover, the chirp conversion elements 43, 45, and 47 have different delay characteristics as shown by reference numerals 44, 46, and 48. An axis of abscissa in the graph portions 44, 46 and 48 indicates a delay time and an axis of ordinate represents a frequency. As will be obvious from the diagram, the delay amounts on the low frequency side in the chirp conversion elements 43 and 45 are small and the delay amounts on the high frequency side are large. Further, as will be understood from the inclinations of the straight lines, in the case of the chirp conversion elements 43 and 45, the change rates of the delay amounts to the frequency differ. On the other hand, in the chirp conversion element 47, the delay amount on the low frequency side is large and the delay amount on the high frequency side is small.

As mentioned above, if the different delay characteristics are used for the chirp conversion elements 43, 45, and 47, even if the outputs of the elements 43, 45, and 47 are added by an adding unit 49, the signal can be separated by using the chirp conversion elements having the opposite delay characteristics on the reception side, respectively.

An output of the adding unit 49 is input to an amplifier 50 and is used to drive a proper transmitting apparatus, for instance, an E/O conversion unit 51. The E/O conversion unit 51 comprises a semiconductor laser element and the like and converts the signal multiplexed by the chirp conversion into the optical signal and outputs into the space or to the transmission path such as an optical fiber or the like.

On the other hand, in the receiving apparatus of FIG. 13, reference numeral 52 denotes an optical/electric conversion unit (O/E conversion unit) for converting the optical signal input from the transmitting apparatus into the electric signal by using a photodiode and the like. Reference numeral 53 denotes an amplifier unit to amplify the electric signal derived from the O/E conversion unit 52. An output of the amplifier unit 53 is input to chirp conversion elements 54, 56, and 58.

The chirp conversion elements 54, 56, and 58 are fundamentally the same as the chirp conversion elements 43, 45, and 47 and have the converting characteristics opposite to those of the chirp conversion elements 43, 45, and 47 as shown in graph portions 55, 57, and 59, respectively.

As mentioned above, by setting the opposite characteristics of the chirp conversion elements 43, 45, and 47 on the transmission side for the chirp conversion elements 54, 56, and 58, the multiplexed signal of the channels 1 to n is separated. The separated signal components are the same as the input signals to the chirp conversion elements 43, 45, and 47 on the transmission side. Therefore, they are input to (n) detection units 60 based on the sync detection system or the like and the high frequency components (carrier) are eliminated from the signals. Thereafter, the signals are input to (n) digital signal conversion units 61 and converted into digital pulse signals of predetermined pulse waveforms, so that the demodulated outputs of n channels are derived.

The chirp conversion elements 43, 45, 47, 54, 56, and 58 use the surface acoustic wave-dispersive delay lines which have already been described in the first and second embodiments. Since the construction of the chirp conversion element 43 is the same as those described in the first and second embodiments, its detailed description is omitted.

The operation in the above construction will now be described. In the transmission unit of FIG. 12, digital signals of n channels are respectively input to n input terminals. The digital input signals are converted into the pulse signals of proper widths by the pulse converters 41. Further, in the balanced modulators 42, the high frequency signal is multiplied by the pulse signals.

The resultant signals are input to the chirp conversion elements 43, 45, and 47 having the characteristics as shown in the graph portions 44, 46, and 48 and converted into the chirp signals.

At this time, the modulated signals of n channels are all input to the chirp conversion elements 43, 45, and 47 having different delay dispersive characteristics as shown by the graph portions 44, 46, and 48. Therefore, the chirp signals in which the dispersive states of the frequency components on the time base are different are obtained as outputs.

The n different chirp signals obtained as mentioned above are added by the adding unit 49 and become one signal and amplified to a proper level by the amplifier unit 50. The added electric signal is converted into the optical signal by the E/O conversion unit 51 and transmitted.

On the other hand, the optical signal transmitted from the transmission unit is received in the O/E conversion unit 52 in the reception unit of FIG. 13 and is converted into the electric signal from the optical signal. The electric signal is then amplified to a proper level by the amplifier unit 53.

The amplified signal is input to the chirp conversion elements 54, 56, and 58 having the different characteristics as shown in the graph portions 55, 57, and 59, respectively. Desired signals are separated and compressed by the chirp conversion elements 54, 56, and 58 and the pulse signals including the high frequency components are output.

Although the input signals include the chirp signals of respective channels, desired chirp signals among them can be separated and compressed by using the chirp conversion elements 54, 56, and 58 having the converting characteristics opposite to those of the chirp conversion elements 43, 45, and 47 of the transmitting apparatus. Since the chirp conversion elements 54, 56, and 58 respond to only the chirp signals corresponding to their converting characteristics, only the signals of desired channels can be certainly separated.

The amplitude modulated signals which were separated by the chirp conversion elements 54, 56, and 58 are input to the detection units 60 and converted into the pulse signals including no high frequency component. In the digital signal conversion units 61, the pulse signals are further converted into the digital signals and output.

According to the above construction, the signals of the channels to be transmitted are converted into the chirp signals by using the different chirp converting characteristics and added and transmitted. On the other hand, on the reception side, the signal of a desired channel can be separated by executing the chirp conversion of the characteristics opposite to those on the transmission side every channel. As shown in FIG. 3A, since the chirp conversion element can be easily and cheaply constructed in a small size, as compared with the conventional multiplex system, there are advantages such that the constructions of the multiplexing apparatus and demultiplexing apparatus are fairly simplified and their costs, sizes, and weights are remarkably reduced.

On the other hand, as in the above embodiment, by applying the present system to the optical spatial transmission or the transmission using an optical fiber or the like, the influences by the attenuation, fluctuation, and the like of the signal on the transmission path are improved, so that there is an advantage such that the quality of the transmission path is improved. Particularly, in the chirp conversion upon demodulation, the waveform of FIG. 3D is compressed in the time base direction and the waveform as shown in FIG. 3E is formed. However, the component which is compressed as mentioned above relates to only the chirp signal formed by predetermined characteristics and the elements do not respond to the noise component or the like. Thus, there is an advantage such that the system is hardly influenced by the external noises.

The conversion gain on the reception side can be evaluated by the product (BT product) of the continuation time T ($t_1$ to $t_2$ in FIG. 3D) and the band width B ($f_1$ to $f_2$ in FIG. 3B) of the chirp signal. In the conversion from the chirp signal, the BT product is generally fairly larger than 1. The signal is converted into the pulse signal of the peak electric power of BT and the pulse width of 1/B. Therefore, on the reception side, the same effect as that in the case where the transmission energy apparently increases is produced with respect to the transmission signal component. Therefore, the S/N ratio is improved and even in a situation such that only the very weak signal can be received, the signal can be certainly reproduced.

On the other hand, since the communication cannot be executed if the chirp converting characteristics on the transmission side and reception side do not have the normal/opposite relation, there is an advantage such that the confidential property of the communication is high.

Although the above embodiment has been described with respect to the case where the digital signals are used as input signals, the chirp conversion elements use the delay lines whose delay times differ depending on the frequencies. If the signals have a plurality of frequency components, they can be converted (or inverse conversion) into the chirp signals by the different converting characteristics. Therefore, the present system can be also used for the frequency modulated waves.

For instance, by using a construction as shown in FIG. 13, the multiplex transmission of the frequency modulated waves can be also executed. In this case, any of analog signals and digital signals can be used as input signals.

Figure 14A:
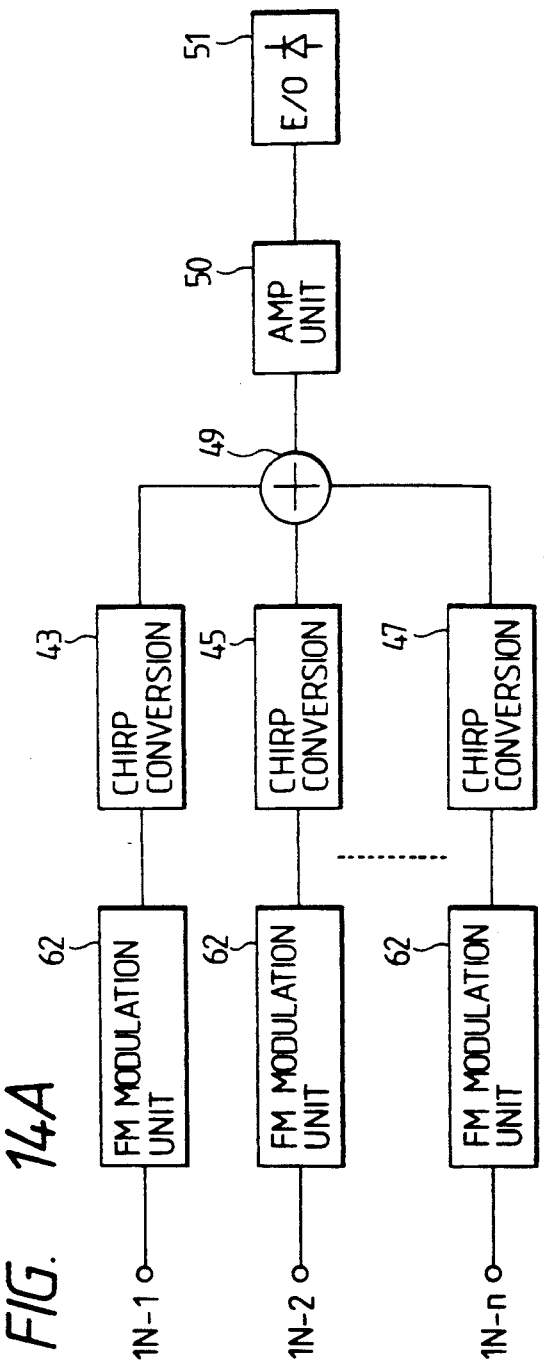
FIGS. 14A and 14B are block diagrams showing other constructions of the transmitting apparatus of FIG. 12 and the receiving apparatus of FIG. 13, respectively.

In FIG. 14A, reference numeral 62 denotes frequency modulation units of n channels. The frequency modulation units 62 frequency modulate (analog or digital) input signals and supply the modulated signals to the chirp conversion elements 43, 45, and 47. A structure after the chirp conversion elements 43, 45, and 47 is similar to that in FIG. 12. The signals which were chirp converted by the chirp conversion elements 43, 45, and 47 are added by the adding unit 49 and the added signal is transmitted as an optical signal through the amplifier 50 and E/O conversion unit 51.

Figure 14B:
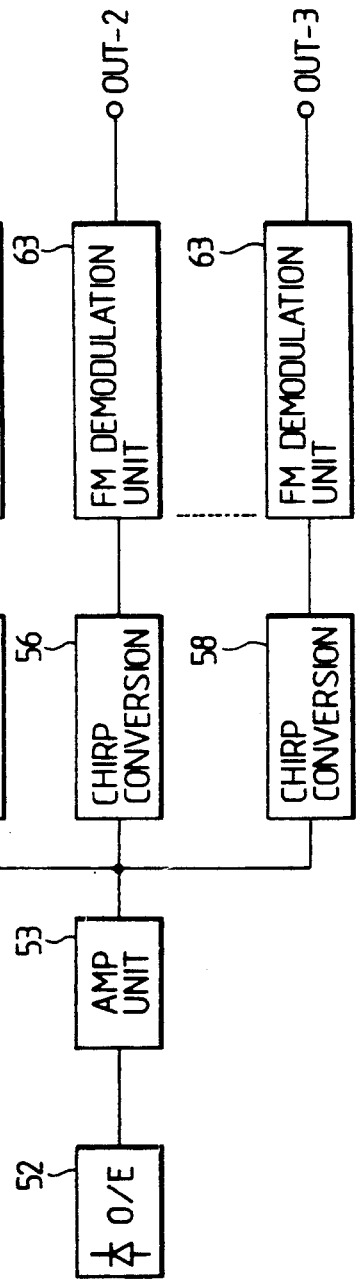

On the other hand, FIG. 14B shows a structure of the receiving apparatus. FIG. 14B differs from FIG. 13 with respect to a point that frequency demodulation units 63 of n channels are connected to the post stage of the chirp conversion elements 54, 56, and 58, respectively.

The signals separated by the chirp conversion elements 54, 56, and 58 by the above construction are the same as the frequency modulated waves which are input to the chirp conversion elements 43, 45, and 47. Therefore, by demodulating those signals by the frequency demodulation units 63, the transmission signals of n channels can be separated and demodulated.

On the other hand, although the third embodiment has been shown with respect to the example of the optical transmission, the signal transmission system itself is not limited to such a transmission. In dependence on the construction of the transmission path, it is also obviously possible to use various transmission systems such as radio transmission by the electromagnetic wave, various kinds of cable transmission, and other transmission systems.

As will be obvious from the above description, according to the third embodiment of the invention, in the multiplex transmission system in which input signals of a plurality of channels are multiplexed and transmitted by using a common transmission path and the signal is separated on the reception side, on the transmission side, the input signals are chirp converted by the different chirp converting characteristics of every channel and, thereafter, the converted signals are added and output to the common transmission path, and on the other hand, on the reception side, each signal is separated by the chirp conversion based on the chirp converting characteristics opposite to the chirp converting characteristics of the channels on the transmission side, and the signals of the channels are reproduced. Therefore, the signals are multiplexed by chirp converting the transmission signals to be multiplexed by the different converting characteristics and by adding the converted signals. On the other hand, on the reception side, the multiplexed signal can be separated by the inverse converting means of the above chirp conversion. Particularly, since the converting circuit for the chirp conversion is very simple, there are advantages such that the multiplexing apparatus and demultiplexing apparatus can be fairly easily and cheaply constructed and their sizes and weights can be reduced. On the other hand, since the signal of each channel is chirp converted, there are advantages such that the S/N ratio is improved, the communication reliability can be improved, the confidential property can be raised, and the like.

The present invention is not limited to the foregoing embodiments but many modifications and variations are possible within the spirit and scope of the appended claims of the invention.

We claim:

1. A digital communicating method comprising the steps of:
   receiving digital signals;
   generating pulses based on said digital signals,
   modulating said generated pulses;
   converting a pulse signal modulated by said modulating step into a chirp signal; and
   converting said chirp signal into an optical signal and outputting as a transmission signal.

2. A digital communicating method comprising the steps of:
   modulating pulses indicative of digital signals;
   converting a pulse signal modulated by said modulating step into a chirp signal; and
   converting said chirp signal into an optical signal and outputting as a transmission signal,
   wherein in said modulating step, a waveform of a predetermined frequency is multiplied by a pulse indicative of "1" of the digital signals and the modulating is executed.

3. A digital communicating method comprising the steps of:
   modulating pulses indicative of digital signals;
   converting a pulse signal modulated by said modulating step into a chirp signal; and
   converting said chirp signal into an optical signal and outputting as a transmission signal,
   wherein in said converting step, a spectrum component of the modulated pulse signal is expanded in a time base direction and is converted into the chirp signal.

4. A method according to claim 3, wherein in said converting step, when the pulse signal is converted into the chirp signal, a surface acoustic wave-dispersive delay line is used.

5. A digital communicating method comprising the steps of:
    modulating pulses indicative of digital signals;
    converting a pulse signal modulated by said modulating step into a chirp signal; and
    converting said chirp signal into an optical signal and outputting as a transmission signal,
    wherein in said modulating step, a waveform of a predetermined frequency is multiplied by the pulses indicative of "1" and "0" of the digital signals and the modulation is executed.

6. A method according to claim 5, wherein in said converting step, the modulated pulse signals of "1" and "0" are converted into the chirp signals having different characteristics, and in said output step, the chirp signals having the different characteristics are converted into the optical signals and output.

7. A digital communicating method comprising the steps of:
    modulating pulses indicative of digital signals;
    converting a pulse signal modulated by said modulating step into a chirp signal; and
    converting said chirp signal into an optical signal and outputting as a transmission signal,
    wherein in said modulating step, a waveform of a predetermined frequency is multiplied by the pulses indicative of the digital signals from a plurality of channels, respectively, and the modulation is executed.

8. A method according to claim 7, wherein in said converting step, the modulated pulses corresponding to the multiplication of the waveform of the predetermined frequency by the pulses indicative of the digital signals from the plurality of channels are converted into chirp signals having different characteristics in every channel, respectively, and in said output step, the chirp signals having different characteristics in every channel are multiplexed and the multiplexed chirp signals are converted into the optical signal and output.

9. A digital communicating method for converting binary digital signals of "1" and "0" into predetermined codes and for transmitting and receiving, comprising the steps of:
    on a transmission side, modulating a carrier of a predetermined frequency by pulses corresponding to the binary digital signals of "1" and "0", respectively, and
    forming and outputting different chirp signals which are obtained by expanding frequency components of said modulated signals in a time base direction by different expanding characteristics, respectively;
    and on a reception side, compressing the frequency components of the received chirp signals by opposite compressing characteristics respectively corresponding to said different expanding characteristics; and
    thereafter, detecting the compressed signals and, thereby, reproducing the original binary digital data.

10. A method according to claim 9, wherein said chirp signals are converted into the optical signals and transmitted on the transmission side, and the received optical signals are converted into the electric signals on the reception side.

11. A method according to claim 9, wherein the time base expansion to the chirp signals and the time base compression of the chirp signals are executed by using surface acoustic wave-dispersion delay lines.

12. A communicating method for multiplexing and transmitting input signals of a plurality of channels by using a common transmission path and, on a reception side, for separating the multiplexed signal, comprising the steps of:
    on a transmission side, chirp converting the input signals by different chirp converting characteristics in every channel; and
    adding the converted chirp signals of every channel and outputting to the transmission path;
    and on the reception side, separating the signals by the chirp conversion based on chirp converting characteristics opposite to the chirp converting characteristics of the channels on the transmission side; and
    reproducing the signal of each channel.

13. A method according to claim 12, wherein said chirp signals are converted into the optical signals and transmitted on the transmission side, and the received optical signals are converted into the electric signals on the reception side.

14. A method according to claim 12, wherein the time base expansion to the chirp signals and the time base compression of the chirp signals are executed by using surface acoustic wave-dispersive delay lines.

15. A communicating method comprising the steps of:
    on a transmission side, modulating a carrier of a predetermined frequency by pulses indicative of transmission digital signals;
    converting the modulated signal into a chirp signal which is obtained by expanding spectrum components of the modulated signal in a time base direction; and
    converting the chirp signal into an optical signal and transmitting to a reception side;
    and on the reception side, compressing in the time base direction the spectrum of the chirp signal obtained by photoelectrically converting the received signal light; and
    detecting a waveform obtained by said compression and reproducing the digital signals.

16. A method according to claim 15, wherein the time base expansion to the chirp signal and the time base compression of the chirp signal and executed by using surface acoustic wave-dispersive delay lines.

17. A method according to claim 15, wherein on the transmission side, the digital signals of "1" and "0" are respectively converted into the chirp signals by elements having different characteristics and the chirp signals are added and transmitted,
    and on the reception side, the digital signals of "1" and "0" are reproduced from the received chirp signals by elements having characteristics opposite to the characteristics of the elements on the transmission side.

18. A method according to claim 17, wherein on the transmission side, the digital signals from a plurality of channels are respectively converted into the chirp signals by elements having different characteristics and the chirp signals are added and transmitted,
    and on the reception side, the digital signals of said plurality of channels are reproduced from the received chirp signals by elements having characteristics opposite to the characteristics of the elements on the transmission side.

19. A communicating apparatus comprising:
modulating means for modulating pulses indicative of digital signals;
converting means for converting the pulse signals modulated by said modulating means into chirp signals; and
output means for converting said chirp signals into optical signals and outputting as transmission signals.

20. A communicating apparatus comprising:
modulating means for modulating pulses indicative of digital signals;
converting means for converting the pulse signals modulated by said modulating means into chirp signals; and
output means for converting said chirp signals into optical signals and outputting as transmission signals,
wherein said modulating means executes the modulation by multiplying a waveform of a predetermined frequency by the pulse indicative of "1" of the digital signals, and
said converting means expands spectrum components of the modulated pulse signals in a time base direction and converts into chirp signals.

21. A communicating apparatus comprising:
modulating means for modulating pulses indicative of digital signals;
converting means for converting the pulse signals modulated by said modulating means into chirp signals; and
output means for converting said chirp signals into optical signals and outputting as transmission signals,
wherein said modulating means executes the modulation by multiplying a waveform of a predetermined frequency by the pulses indicative of "1" and "0" of the digital signals,
said converting means converts the modulated pulse signals of "1" and "0" into the chirp signals having different characteristics, respectively, and
said output means converts the chirp signals having different characteristics into the optical signals and outputs.

22. A communicating apparatus comprising:
modulating means for modulating pulses indicative of digital signals;
converting means for converting the pulse signals modulated by said modulating means into chirp signals; and
output means for converting said chirp signals into optical signals and outputting as transmission signals.
wherein said modulating means performs the modulation by multiplying a waveform of a predetermined frequency by the pulses indicative of the digital signals from a plurality of channels, respectively, to form a plurality of modulated pulse signals,
said converting means converts the modulated pulse signals into the chirp signals having different characteristics in every channel, respectively, and
said output means multiplexes the chirp signals having different characteristics in every channel and converts the multiplexed chirp signals into the optical signals.

23. A digital communication method for converting binary digital signals of "1" and "0" into predetermined codes and for transmitting and receiving, comprising the steps of:
on a transmission side, modulating a carrier of predetermined frequency by pulses corresponding to the binary digital signals of "1" and "0", respectively; and
forming and outputting different chirp signals which are obtained by expanding frequency components of said modulated signals in a time base direction by different expanding characteristics, respectively; and
on a reception side, compressing the frequency components of the received chirp signals by opposite compressing characteristics, respectively corresponding to said different expanding characteristics; and
thereafter, detecting the compressed signals and, thereby, reproducing the original binary digital signals,
wherein said different expanding characteristics include a characteristic wherein a high-band side of the frequency components is delayed and a characteristic wherein a low-band side of the frequency components is delayed.

* * * * *

UNITED STATES PATENT AND TRADEMARK OFFICE
CERTIFICATE OF CORRECTION

PATENT NO. : 5,105,294

DATED : April 14, 1992

INVENTOR(S) : YASUSABURO DEGURA ET AL.

It is certified that error appears in the above-identified patent and that said Letters Patent is hereby corrected as shown below: On title page,

AT [56] REFERENCES CITED

Other Publications,
"AOW-Baele-" should read --AOW-Bauele--.

COLUMN 1

Line 20, "made" should read --made to--.

COLUMN 2

Line 11, "timesharing" should read --time-sharing--.

COLUMN 5

Line 61, "f$_0$as" should read --f$_0$ as--.

COLUMN 7

Line 22, "output, on" should read --output. On--.

COLUMN 9

Line 33, "T=20 nsec the" should read --T=20 nsec, the--.

COLUMN 11

Line 1, "BY" should read --By--.
Line 29, "80" should read --20--.

UNITED STATES PATENT AND TRADEMARK OFFICE
CERTIFICATE OF CORRECTION

PATENT NO. : 5,105,294

DATED : April 14, 1992

INVENTOR(S) : YASUSABURO DEGURA ET AL.

It is certified that error appears in the above-identified patent and that said Letters Patent is hereby corrected as shown below:

COLUMN 16

Line 39, "signals," should read --signals;--.

COLUMN 18

Line 49, "and" should read --are--.

Signed and Sealed this

Fourteenth Day of September, 1993

Attest:

BRUCE LEHMAN

Attesting Officer

Commissioner of Patents and Trademarks